No. 628,276. Patented July 4, 1899.
J. MEALEY.
SINGLETREE HOOK.
(Application filed May 17, 1898.)
(No Model.)

Witnesses:
O. E. Van Doren
Richard Paul

Inventor:
Johnston Mealey,
By Paul O Hawley
his attorneys.

UNITED STATES PATENT OFFICE.

JOHNSTON MEALEY, OF HOWARD LAKE, MINNESOTA, ASSIGNOR OF ONE-HALF TO JOHN F. McDONALD, OF MINNEAPOLIS, MINNESOTA.

SINGLETREE-HOOK.

SPECIFICATION forming part of Letters Patent No. 628,276, dated July 4, 1899.

Application filed May 17, 1898. Serial No. 680,913. (No model.)

*To all whom it may concern:*

Be it known that I, JOHNSTON MEALEY, of Howard Lake, Wright county, State of Minnesota, have invented certain new and useful Improvements in Singletree-Hooks, of which the following is a specification.

This invention relates to singletree-hooks; and the object of the invention is to provide a singletree-hook from which the tug-cockeye cannot by accident become detached, but instead must be placed in a particular position with respect to the cockeye before the latter can be removed.

The invention consists generally in a singletree-hook comprising a thimble to be placed on the end of the singletree or whiffletree and having a hook projecting from its forward side and turned toward the middle of the whiffletree and on its end provided with an arrow-shaped head, the large end of which is too big to slip through the small or V-shaped end of a cockeye when the latter is placed upon the hook.

The invention will be more readily understood by reference to the accompanying drawings, forming part of this specification, and in which—

Figure 2:
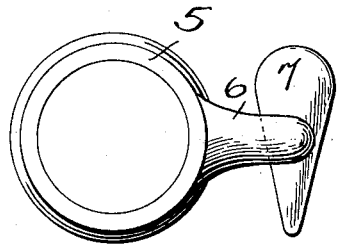
Figure 3:
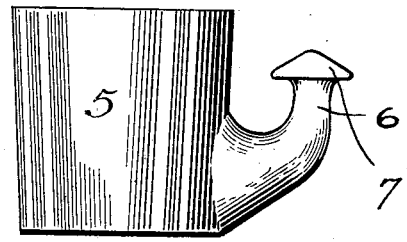
Figure 4:
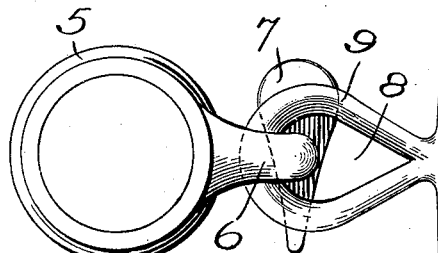
Figure 5:
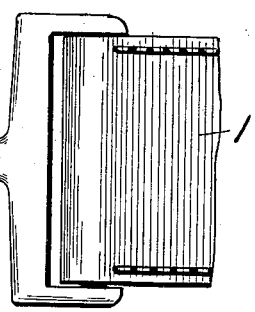
Figure 1:
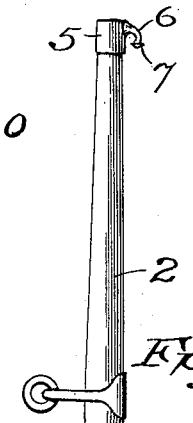

Figure 1 is a plan view of a singletree provided with hooks embodying my invention. Fig. 2 is a view of the end of a device embodying my invention. Fig. 3 is a plan view thereof. Fig. 4 is an end view showing the device as it appears when draft is exerted upon the tug. Fig. 5 shows the position of the hook when the whiffletree is allowed to drop by the slackening of the tug.

As shown in the drawings, 2 represents the whiffletree or singletree, which is usually attached to the doubletree by a clip or clevis provided at the middle of the singletree. A hook is provided at each end of the singletree, and, as shown in the detail figures of the drawings, the device comprises the preferably-tapered sleeve or thimble 5 to be secured upon the end of the whiffletree. From the outer part and the forward side of the thimble 5 projects the substantially L-shaped hook 6, the end of which is turned inwardly—that is, toward the middle of the singletree. On the end of the hook 6 is the arrow-shaped head 7, the large end of which is uppermost. This head is of greater length than the opening 8 in an ordinary cockeye 9, with which the end of a tug 10 is finished. Hence when the whiffletree drops down on account of the slackening of the tugs the large end of the arrow-shaped head 7 will hang opposite the small end of the opening in the cockeye, while the narrow point of the head will project back beyond the large portion of the cockeye. Thus it will be seen that it will be impossible to detach the tug from the hook without twisting or turning the cockeye around, so that its narrow end is opposite the narrow end of the head of the whiffletree-hook.

The device is of a most simple construction and is very strong and neat, and is particularly adapted for use with work-harnesses.

Having thus described my invention, I claim as new and desire to secure by Letters Patent—

The combination, with a singletree, of a sleeve 5 provided on its end, said sleeve being provided on its forward side with a hook 6 having an inwardly-turned outer end, an arrow-shaped head 7 provided on the inwardly-turned end of said hook 6 the larger end of said arrow-head being uppermost, and a tug-cockeye having an arrow-shaped opening 8 corresponding to said head 7 but reversely arranged whereby when the tug is slack and the singletree drops the cockeye will slide along the inwardly-turned end of the hook 6 and the larger end of said head will be opposite the smaller end of the opening in said cockeye, substantially as described.

In testimony whereof I have hereunto set my hand, this 20th day of April, 1898, at Minneapolis, Minnesota.

JOHNSTON MEALEY.

In presence of—
C. G. HAWLEY,
M. E. GOOLEY.